United States Patent [19]

Chen et al.

[11] Patent Number: 4,808,905

[45] Date of Patent: Feb. 28, 1989

[54] CURRENT-LIMITING CIRCUIT

[75] Inventors: Shallop J. Chen, Milpitas, Calif.; Jan Johansson, Balsta, Sweden

[73] Assignee: Advanced Micro Devices, Inc., Sunnyvale, Calif.

[21] Appl. No.: 893,138

[22] Filed: Aug. 5, 1986

[51] Int. Cl.$^4$ ................................................. G05F 1/46

[52] U.S. Cl. ..................................... 323/222; 323/285; 361/18

[58] Field of Search ............... 323/222, 282, 283, 284, 323/285, 288; 361/18

[56] References Cited

U.S. PATENT DOCUMENTS 4,428,015  1/1984  Nesler ............................ 323/285 X
4,494,178  1/1985  Ishima ................................. 363/21

OTHER PUBLICATIONS

Nelson, "Switching Controller Chip Handles 100W from a 5-Pin Package", Electronic Design, Dec. 26, 1985, pp. 73-78.

Primary Examiner—Peter S. Wong
Attorney, Agent, or Firm—Davis Chin

[57] ABSTRACT

A subscriber power controller device for converting a high voltage at a S interface into a stable, regulated low voltage to be used by integrated circuits in an ISDN terminal includes a control logic circuit for generating an output signal to control the duty cycle of an output transistor in an output driver circuit. The control logic circuit is responsive to a ramp signal, an error signal, a high reference voltage signal, a low reference voltage signal and a synchronizing signal for generating the output signal. The output signal is in the form of a pulse train in which each pulse thereof is variable in width dependent upon the error signal. A current-limiting circuit is provided and is responsive to output current of the output transistor for generating a current-limiting signal when the output current exceeds a certain preset limit. The control logic circuit is responsive to the current-limiting signal for automatically terminating each pulse of the pulse train in the output signal on a pulse-by-pulse basis when the output current exceeds the preset limit.

5 Claims, 5 Drawing Sheets

CURRENT-LIMITING CIRCUIT

BACKGROUND OF THE INVENTION

This invention relates generally to power regulation circuits and more particularly, it relates to a current-limiting circuit for use in a subscriber power controller device which supplies power across the S interface of the Integrated Services Digital Network (ISDN).

In the field of telecommunications, use of digital signalling techniques in transmitting information over long distances is gaining more and more prominence for a wide range of communication, including voice, computer data and video data. Typically, the S or subscriber lines interface as referred to by the Consultative Committee for Telegraphy and Telephony (CCITT) is used to interconnect ISDN terminal equipment to one or more network terminators such as private branch exchanges (PBX). A subscriber power controller (SPC) is used to convert the 40 volts delivered at the S interface into a stable, regulated 5 volt power supply for integrated circuits in the ISDN terminal equipment such as a telephone or data generating equipment. Such a power controller is manufactured and sold by Advanced Micro Devices, Inc., Sunnyvale, Calif., under part No. Am 7936. The subscriber power controller is an integrated circuit formed of a single-chip package and has as one of its capabilities a current-limiting feature which protect the device from damage caused by a short circuit at its output.

The subscriber power controller includes a control logic circuit which generates an output signal which sets the duty cycle of an output switching transistor. In other words, the output signal is pulse-width modulated. A current-limiting circuit of the present invention is provided as a part of the same subscriber power controller integrated circuit for performing such limiting of the current drawn from the output. The current-limiting circuit includes a comparator for comparing a voltage drop across an external resistor representative of the output current with a reference voltage. When the output current exceeds a certain limit, a current-limiting signal is fed to the control logic circuit for disabling or terminating of the output pulse on a pulse-by-pulse basis. Once the output current returns to its normal level, the output pulse will reappear at the very next cycle, thereby allowing for a short recovery time.

SUMMARY OF THE INVENTION

In the preferred embodiment of the present invention, the subscriber power controller includes a control logic means for generating an output signal to control the duty cycle of an output transistor in an output driver circuit. The control logic means is responsive to a ramp signal, an error signal, a high reference voltage signal, a low reference voltage signal, and a synchronizing signal for generating the output signal. The output signal is in the form of a pulse train in which each pulse thereof is variable in width dependent upon the error signal. A current-limiting circuit is responsive to output current of the output transistor for generating a current-limiting signal when the output current exceeds a certain preset limit. The control logic means in response to the current-limiting signal automatically terminates each pulse of the pulse train in the output signal on a pulse-by-pulse basis when the output current exceeds the preset limit.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DETAILED DESCRIPTION OF THE PREFERRED EMBODIMENT

Figure 1:
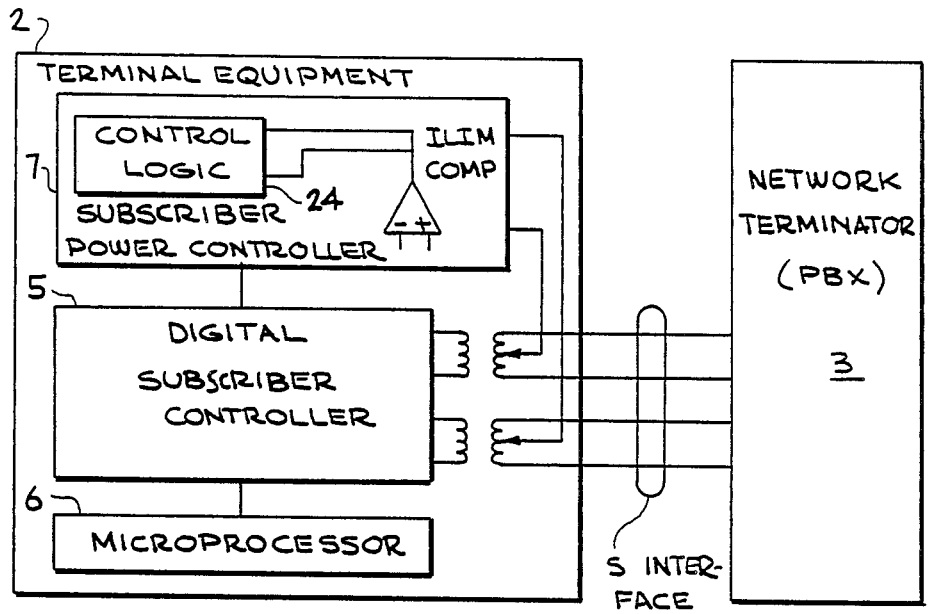
FIG. 1 is an overall block diagram of an integrated services digital network (ISDN) for communication across the S or subscriber interface, according to the present invention.

Referring now in detail to the drawings, there is shown in FIG. 1 an overall block diagram of an integrated services digital network (ISDN) for communication across the S or subscriber lines interface which connects the terminal equipment 2 to a network terminator 3 such as a private branch exchange (PBX). The terminal equipment 2 includes a digital subscriber controller 5, a microprocessor 6 and a subscriber power controller 7 of the present invention. As previously explained, the subscriber power controller device is an integrated circuit which converts the 40 volts delivered at the S interface into a stable, regulated 5 volt power supply for other chips in the ISDN terminal equipment.

Figure 2A:
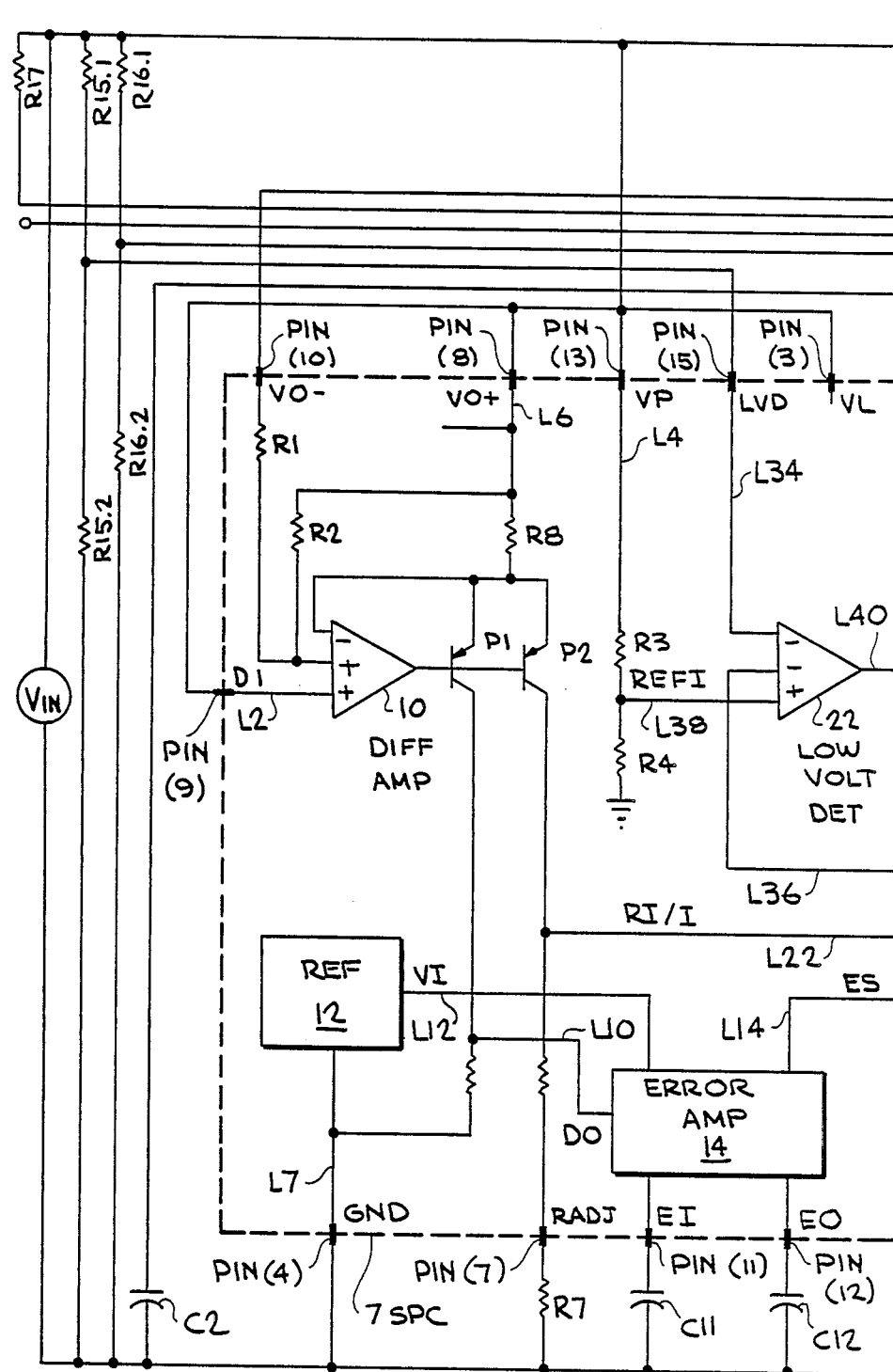
FIGS. 2a and 2b are schematic block diagrams of the subscriber power controller constructed in accordance with the present invention.
Figure 2B:
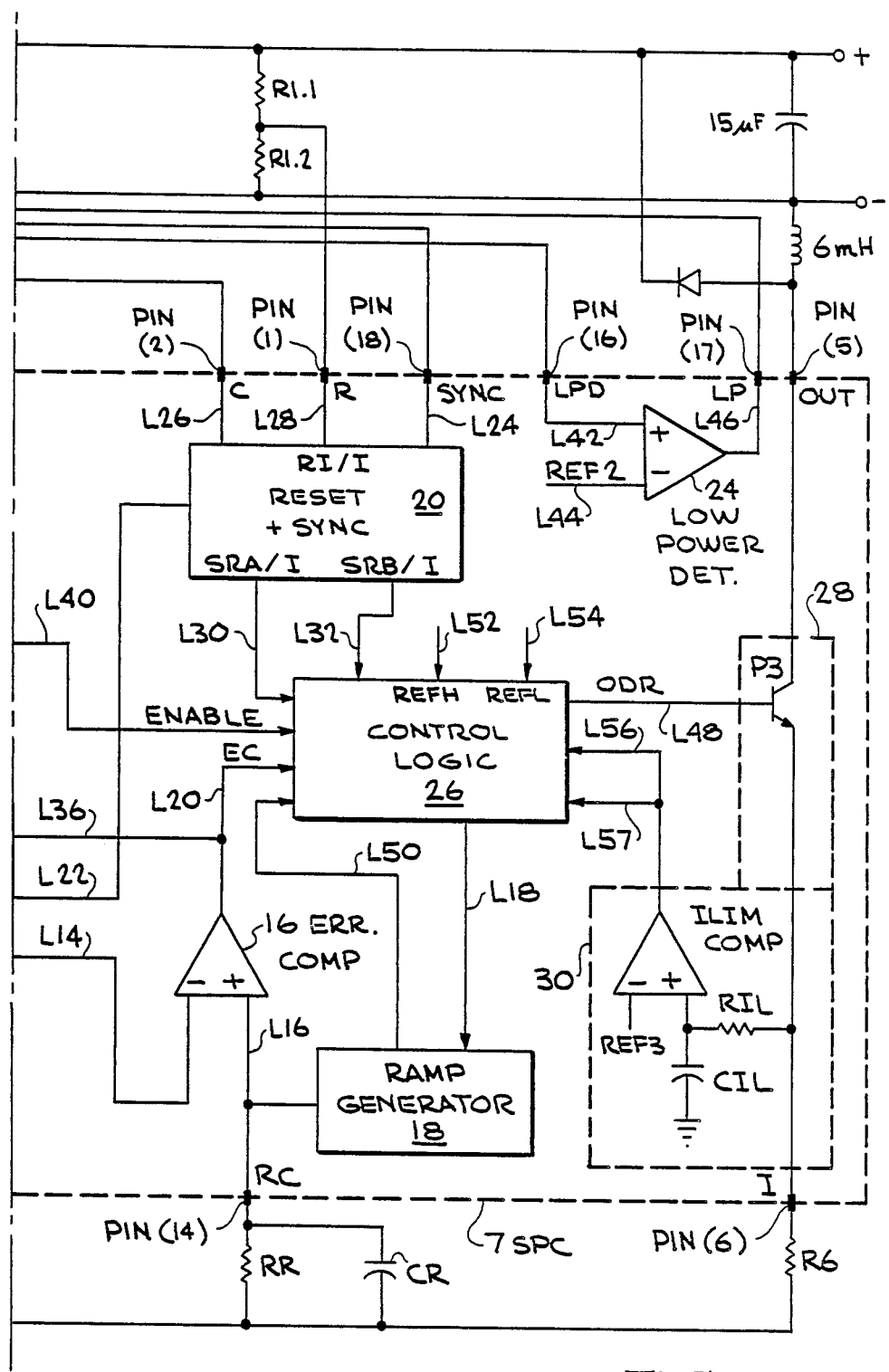

As can be seen in FIG. 2, there is illustrated a schematic block diagram of a subscriber power controller device (SPC) with current limiting of the present invention. The controller device SPC includes a differential amplifier circuit 10, an internal supply voltage circuit 12, an error amplifier circuit 14, an error comparator circuit 16, a ramp generator 18, a reset and synchronization interface circuit 20, a low voltage detection circuit 22, a low power detection circuit 24, a control logic circuit 26 and an output driver circuit 28. As a part of the same subscriber power controller integrated circuit or chip, there is provided a current-limiting circuit 30 which functions to protect the device from damage caused by a short circuit at its output. The various pins 1 through 18 of the controller device are connected to external components which do not form in general a part of the present invention and thus, a discussion of their detailed interconnection has been intentionally omitted for the sake of clarity, except where it is necessary.

The differential amplifier circuit 10 has a non-inverting input for receiving an input signal DI connected by a line L2 to a pin 9 which is, in turn, connected to pin 13 for receiving a primary supply voltage VP of typically +40 volts on line L4. The junction of the series-connected resistors R1 and R2 is connected to the other non-invertng input in the differential amplifier circuit 10. The ends of the respective resistors R1 and R1 are connected to the respective pins 8 and 10. The pin 8 has a positive regulated output voltage VO+ on line L6 of typically +40 volts relative to the circuit ground applied to pin 4. The pin 10 provides a negative output voltage VO− of typically +35 volts relative to the circuit ground potential on line L7 or −5 volts relative to the positive voltage VO+. The inverting input of the circuit 10 is also connected to the positive voltage VO+ on the line L6 via a resistor R8. The differential amplifier circuit functions to sense the floating output voltage between VO+ and VO−, and converts it into an output voltage which is referenced to the ground potential. The output voltage is fed through to a level-shifting output stage formed of PNP transistors P1 and P2.

The error amplifier 14 receives an input voltage DO on line L10 from the collector of the transistor P1 and an internal supply voltage VI of +5.08 volts from the reference circuit block 12 via line L12. The error amplifier 14 has two external pins 11 and 12 which are connected to two compensation capacitors to help the loop stability of the controller device. The error amplifier functions to amplify and compensate the input signal DO from the differential amplifier. An error signal ES from the error amplifier 14 on line L14 is connected to the inverting input of the error comparator 16. The non-inverting input of the error comparator 16 is from the output of the ramp generator 18 on line L16. The output signal RC on line L16 from the ramp generator 18 is a sawtooth waveform having a frequency determined by an external capacitor CR and a resistor RR which are connected to pin 14. The input signal RCDR to the ramp generator 18 on line L18 is from the control logic circuit 26. The error comparator 16 has an output signal EC on line L20 which is fed as an input to the control logic circuit 26.

The reset and synchronization interface circuit 20 receives an input signal RI/I from the collector of the transistor P2 via line L22. The circuit 20 also receives an input synchronizing signal SYNC on line L24 connected to pin 18. The synchronizing signal SYNC is a squarewave having a frequency of 192 kHz. The output of the circuit 20 on line L26 is connected to pin 2 for connection to an external reset capacitor C2 which determines the reset pulse width. The output signal RI/I on line L28 is a reset pulse signal which goes high when a low output voltage condition exists. Output signals SRA/I and SRB/I on respective lines L30 and L32 are modified synchronizing signals which are fed to the control logic circuit 26. A detailed schematic circuit diagram of the reset and synchronization circuit and its operation is shown and described in a co-pending patent application Ser. No. 893,432 filed Aug. 5, 1986 and assigned to the same assignee hereof.

The low voltage detection circuit 22 receives an input signal LVD on an inverting input via line L34 which is connected to pin 15. The other inverting input of the circuit 22 is from the output of the error comparator circuit 16 which is connected by line L36. The non-inverting input of circuit 22 is connected to a reference supply REF1 at the junction of series-connected resistors R3 and R4 via line L38. The ends of the resistors R3 and R4 are connected to pin 13 and the ground potential, respectively. The output of the low voltage detection circuit 22 on line L40 is connected to the control logic circuit 26. The circuit 22 functions to disable the power controller device when the primary input supply voltage drops below a certain preset value.

The low power detection circuit 24 receives an input signal LPD on its non-inverting input via line L42 which is connected to pin 16. The inverting input of circuit 24 receives a reference voltage REF2 via line L44. The output signal LP of the circuit 24 is on line L46 which is connected to pin 17. The low power detection circuit 24 functions to monitor the primary supply voltage and compares a part of it with the internal reference voltage REF2. When the supply voltage drops below a certain level indicating a low power condition, the output signal LP will become a low potential so as to inform the microprocessor 6 (FIG. 1) connected to the pin 17 of a low power condition. As a result, the microprocessor will disconnect all high power functions so as to conserve power. A detailed schematic circuit diagram of the low voltage detection circuit 22 and the low power detection circuit 24 and their operations are shown and described in a co-pending patent application Ser. No. 908,536 filed Sep. 17, 1986 and assigned to the same assignee hereof.

The control logic circuit 26 serves to control the switching cycle of the output transistor P3 in the output driver circuit 28 via line L48 and to control the timing of the ramp generator 18 via the line L18. The input signals to the control logic circuit 26 are the error signal EC from the error comparator 16 on line L20, the ramp signal RC from the ramp generator 18 on the line L50, the synchronizing signal SRA/I from the circuit 20 on the line L30, the synchronizing signal SRB/I from the circuit 20 on the line L32, a high reference voltage REFH on the line L52, a low reference voltage REFL on line L54, and the output current light signal ILIM from the current-limiting circuit 30 via the lines L56 and L57. The output signals from the control logic circuit 26 are the signal ODR on the line L48 which sets the duty cycle of the output transistor P3 and the signal RCDR on the line L18 which is fed to the ramp generator 18 for generating the ramp signal RC on the line L50.

The control logic circuit 26 receives the output signal EC of the error comparator 16, which compares the error signal ES on the line L14 with the ramp signal RC on the line L16, and synchronizes them with the synchronizing signal SRA/I in order to generate the output signal ODR. The ramp signal RC is synchronized with the synchronizing signal SRB/I and is confined between the high reference voltage REFH and the low reference voltage REFL. The high reference voltage REFH is typically set to be +2.4 volts, and the low reference voltage is typically set to be at +1.62 volts.

Figure 3:
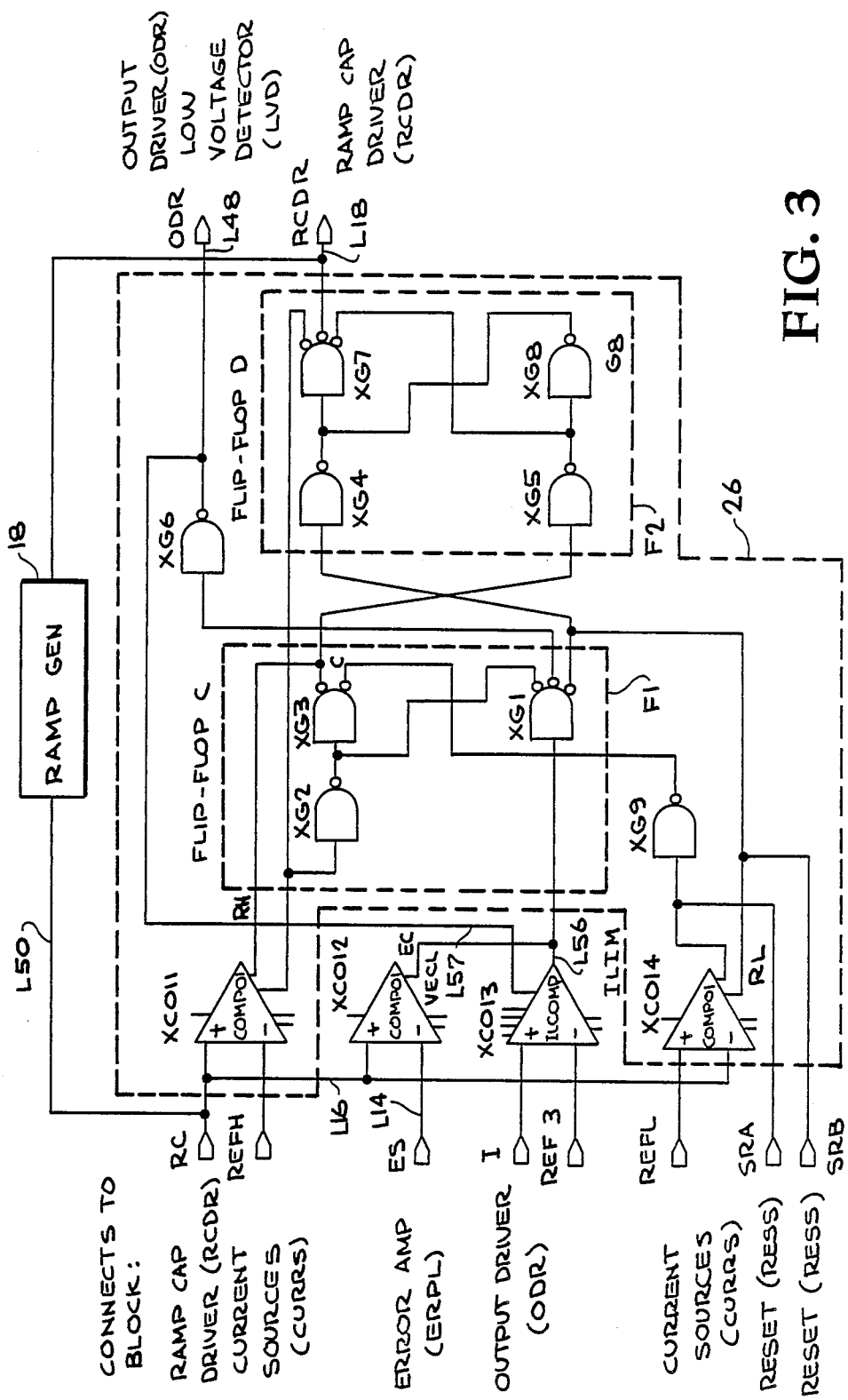
FIG. 3 is a more detailed logic diagram of the control logic circuit of FIG. 2.

A more detailed logic diagram of the control logic circuit 24 is shown in FIG. 3. The control logic circuit 24 includes a first comparator XCO11, a second comparator XCO14, a first R-S flip-flop F1, a second R-S flip-flop F2, a first ECL gate XG6, and a second ECL gate XG9. The first flip-flop F1 is formed of NAND logic gates XG1, XG2 and XG3, and the second flip-flop F2 is formed of NAND logic gates XG4, XG5, XG7 and XG8. The first comparator XCO11 is used to compare the ramp signal RC with the high reference voltage REFH to produce an output signal RH. The second comparator XCO14 is used to compare the ramp signal RC with the low reference voltage REFL to produce an output signal RL.

The comparator XCO12 corresponds to the error comparator 16 of FIG. 2 and is used to compare the ramp signal RC with the error signal ES. This output signal EC of the comparator XCO12 on the line L20 is fed to the control logic circuit 26. A current-limiting comparator XCO13 corresponds to the one in the current-limiting circuit 30 of FIG. 2. The comparator XCO13 is used to receive the output current signal I via an external resistor R6 connected to pin 6.

Figure 4:
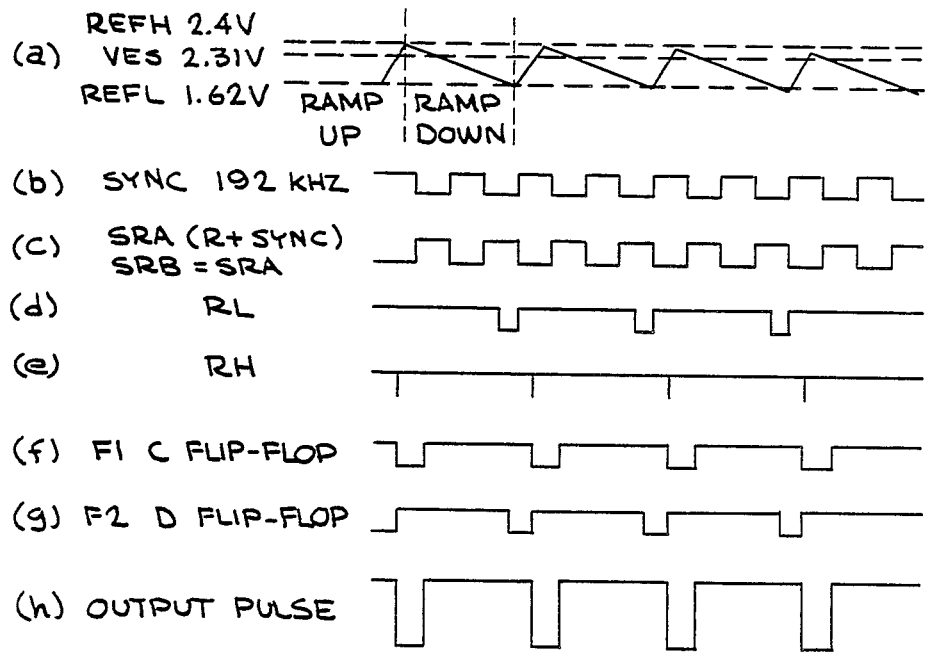
FIGS. 4(a) through 4(h) are waveforms useful in understanding the operation of the present invention in FIGS. 2 and 3.

There are illustrated in FIGS. 4(a) through 4(h) waveforms which are useful in understanding the operation of the control logic circuit 24. The ramp signal RC on the line L50 which is fed to the control logic circuit 26 is shown in FIG. 4(a). The high reference voltage REFH of +2.4 volts, the low reference voltage REFL of +1.62 volts and the error signal of a typical +2.31 volts are shown by the dotted horizontal lines in FIG. 4(a). The synchronizing clock signal of 192 kHz which is received by the circuit 20 via the pin 18 is depicted in FIG. 4(b). The synchronizing signals SRA/I and SRB/I from the circuit 20 are illustrated in FIG. 4(c). The output signal RL from the second comparator XCO14 is shown in FIG. 4(d), and the output signal RH from the first comparator XCO11 is shown in FIG. 4(e). The output of the first flip-flop F1 is shown in FIG. 4(f). The output of the second flip-flop F2 is shown in FIG. 4(g). The output pulse train from the collector of the switching transistor P3 which is connected to pin 5 is depicted in FIG. 4(h).

Since the high reference voltage REFH and the low reference voltage REFL are at a constant level, it is only the error signal ES which varies the duty cycle (pulse width) of the output pulses. With a regulated +5 volts output, the error signal ES will be typically at the +2.31 volts and the output pulses will have a normal pulse width as are shown in FIGS. 4(a) and 4(h), respectively. If the output voltage becomes higher than +5 volts, the error signal ES will be increased above the +2.31 volts level so as to cause the pulse width to become narrower. This continues on a pulse-by-pulse basis until the output voltage returns to +5 volts. If the output voltage becomes lower than +5 volts, the error signal ES will decrease below the +2.31 volts level so as to cause the pulse width to become wider. The width of each pulse for each cycle can be varied in this manner so as to provide very quick and accurately regulated output voltage of +5 volts.

Referring again to FIGS. 2 and 3, the current-limiting circuit 30 comprises a comparator ILIM COMP or XCO13 for sensing the output current I in the output transistor P3 which is detected as a voltage drop across an external resistor R6 of 1 ohm. One end of the resistor R6 is connected to the emitter of the output transistor P3 via the pin 6 and the other end of the resistor R6 is connected to the ground potential. This voltage across the resistor R6 is fed to the non-inverting input of the comparator via a low-pass filter formed of an equivalent resistor RIL and an equivalent capacitor CIL for eliminating overshooting due to switching of the output transistor. This low-pass filtered voltage is compared with a reference voltage REF3 fed to the inverting input of the comparator. The outputs of the comparator on line L56 and line L57 are fed to the control logic circuit 26. As can be best seen from FIG. 3, the output on the line L56 of the comparator XCO13 is wire-ANDed with the error signal EC from the comparator XCO12 and then delivered to the input of the gate XG1 of the flip-flop F1. The output on the line L57 of the comparator XCO13 is wire-ANDed with the output signal from the gate XG6 to form the output signal ODR which is fed to the base of the output transistor P3.

Normally, the output signal on the line L57 of the current-limiting comparator XCO13 will be at a low voltage level (negative logic 1) so as to have no effect on the output signal ODR. This signal ODR will be determined by the output of the gate XG6. As a result, the output pulse shown in FIG. 4(h) will appear at the pin 5. However, when the filtered voltage exceeds the reference voltage REF3, the output pulse for a particular cycle will be substantially disabled or terminated. In actual practice, however, the output pulse will have an infinitesimal width. This continues for each subsequent cycle until the output current is returned to the normal level. When this happens, the output pulse will reappear during the very next cycle which produces a short recovery time. Thus, the output voltage can be restored to the +5 volts in a very short time.

Figure 5:
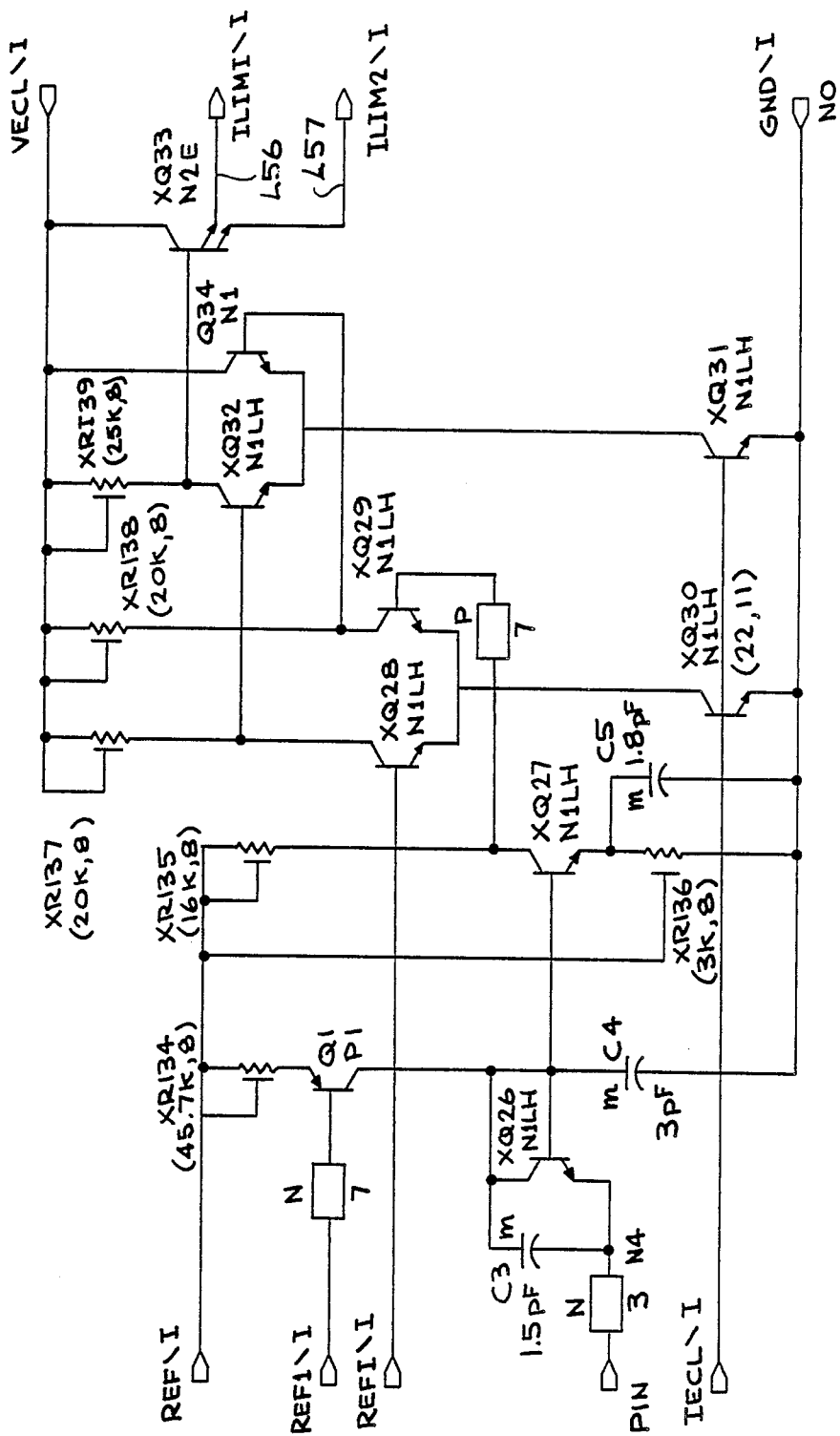
FIG. 5 is a schematic circuit diagram of the current-limiting circuit of FIG. 3.

There is illustrated in FIG. 5 a detailed circuit diagram of the current-limiting circuit of FIG. 2. The current-limiting circuit 30 includes a first differential amplifier formed of transistors Q28 and Q29, a first current source formed of transistor Q30, a second differential amplifier formed of transistors Q32 and Q34, a second current source formed of transistor Q31 and an emitter follower transistor Q33. The emitter follower transistor Q33 has a first emitter to supply a signal ILIM1 corresponding to the output on the line L56 and a second emitter to provide a signal ILIM2 corresponding to the output on the line L57.

From the foregoing detailed description, it can thus be seen that the present invention provides an improved subscriber power controller device which includes a control logic circuit for generating an output signal in the form of a pulse train whose pulse width is variable on a pulse-by-pulse basis. Further, the power controller includes a current-limiting circuit which protects the device from damage caused by a short circuit at its output. Since the current-limiting capability is done on a pulse-by-pulse basis, there is provided an output signal which has a very quick recovery time once the short circuit has been removed.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

We claim:

1. In a subscriber power controller device for converting a high voltage at an S interface into a stable, regulated low voltage to be used by integrated circuits in an ISDN terminal equipment, said controller device including control logic means for generating an output signal to control the duty cycle of an output transistor in an output driver circuit, the improvement comprising:

means for generating a high reference voltage;
means for generating a low reference voltage;
synchronization means for generating a synchronizing signal;
means for generating a signal indicative of the regulated low voltage;
ramp generator means for generating a ramp signal;

error comparator means for comparing the signal indicative of the regulated low voltage with the ramp signal to provide an error signal;

said control logic means being responsive to the ramp signal, the error signal, the high reference voltage, the low reference voltage, and the synchronizing signal for generating the output signal, said output signal being a pulse train in which each pulse thereof is variable in width dependent upon the error signal;

current-limiting means responsive to output current of the output transistor for generating a current-limiting signal when the output current exceeds a certain preset limit;

said current-limiting means being formed of a comparator having a non-inverting input, an inverting input, an output, an external resistor, and a low-pass filter;

said external resistor being connected to the emitter of the output transistor for converting the output current to a sensed voltage;

said low-pass filter including a resistor and a capacitor, said resistor having one end connected to the capacitor and to the non-inverting input of the comparator, the other end of said resistor being connected to receive the sensed voltage;

said comparator having its inverting input connected to a reference voltage for setting the certain preset limit; and said control logic means being responsive to said current-limiting signal for automatically terminating each pulse of the pulse train in the output signal on a pulse-by-pulse basis when the output current exceeds the preset limit.

2. In a controller device as claimed in claim 1, wherein said comparator is formed of a first differential amplifier, a first current source, a second differential amplifier, a second current source and an emitter follower transistor, said first differential amplifier consisting of a first input transistor and a first reference transistor whose emitters are connected together, said first current source being connected to the emitters of said first input and first reference transistors, said second differential amplifier consisting of a second input transistor and a second reference transistor whose emitters are connected together, said second current source being connected to the emitters of said second input and second reference transistors, said second input and second reference transistors having their bases connected to respective collectors of said first input and first reference transistors, said emitter follower transistor having its base connected to one of said second input and second reference transistors.

3. In a controller device as claimed in claim 2, wherein said emitter follower transistor has plural emitters for providing the current-limiting signal.

4. In a controller device as claimed in claim 1, wherein said control logic means includes a first comparator for comparing said ramp signal with said high reference voltage and a second comparator for comparing said ramp signal with said low reference voltage.

5. In a controller device as claimed in claim 4, wherein said control logic means further includes a first flip-flop, a first NAND logic gate, a second flip-flop and a second NAND logic gate which are responsive to the outputs of said first and second comparators for generating the ramp signal

* * * * *